(12) United States Patent
Datta et al.

(10) Patent No.: US 9,325,697 B2
(45) Date of Patent: Apr. 26, 2016

(54) PROVISIONING AND MANAGING CERTIFICATES FOR ACCESSING SECURE SERVICES IN NETWORK

(71) Applicant: HEWLETT-PACKARD DEVELOPMENT COMPANY, L.P., Houston, TX (US)

(72) Inventors: Kaushik Datta, Bangalore (IN); Craig J. Mills, Davis, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 13/755,301

(22) Filed: Jan. 31, 2013

(65) Prior Publication Data

US 2014/0215207 A1    Jul. 31, 2014

(51) Int. Cl.
*H04L 29/06*    (2006.01)

(52) U.S. Cl.
CPC ............ *H04L 63/0823* (2013.01); *H04L 63/10* (2013.01)

(58) Field of Classification Search
CPC combination set(s) only.
See application file for complete search history.

(56) References Cited

U.S. PATENT DOCUMENTS

| | | | |
|---|---|---|---|
| 7,114,175 B2 | 9/2006 | Lahteenmaki | |
| 7,450,560 B1 | 11/2008 | Grabelsky et al. | |
| 7,590,684 B2 | 9/2009 | Herrmann | |
| 7,809,940 B2 * | 10/2010 | Zilinskas et al. | 713/156 |
| 2004/0059686 A1 * | 3/2004 | Levesque | 705/71 |
| 2007/0234059 A1 * | 10/2007 | Ohara | 713/176 |
| 2007/0266164 A1 * | 11/2007 | Balfanz et al. | 709/229 |
| 2009/0025080 A1 | 1/2009 | Lund et al. | |
| 2009/0138946 A1 * | 5/2009 | Schneider et al. | 726/5 |
| 2010/0313262 A1 * | 12/2010 | Mehta et al. | 726/12 |
| 2011/0213966 A1 | 9/2011 | Fu et al. | |
| 2011/0283103 A1 | 11/2011 | Eyal et al. | |
| 2012/0198543 A1 * | 8/2012 | Rogers et al. | 726/17 |
| 2014/0020082 A1 * | 1/2014 | Leggette et al. | 726/10 |

OTHER PUBLICATIONS

"Configuring the HTTP Secure Switch," Cisco Systems Catalyst 6500 Series Switch and Cisco 7600 Series Router Network Analysis Module Installation and Configuration Note, Release 4.0, 2006.

* cited by examiner

*Primary Examiner* — Beemnet Dada
(74) *Attorney, Agent, or Firm* — Hewlett Packard Enterprise Patent Department (57) ABSTRACT

Systems and methods for provisioning and managing of certificates in a network are described. In one implementation, a signing certificate is generated by a network device based on a root certificate of the network device. Based on the signing certificate of the network device, a client-device certificate is signed for a client device. The signed client-device certificate is provided to the client device for allowing the client device to access a secure service provided by the network device.

20 Claims, 6 Drawing Sheets

PROVISIONING AND MANAGING CERTIFICATES FOR ACCESSING SECURE SERVICES IN NETWORK

BACKGROUND

The advent of information technology has led to an exponential growth in data communication over the Internet and other networks. In a network, network devices, such as network switches, provide a variety of network-based services. Applications hosted in client devices, such as servers, communicate with the network devices, over the network, to access such services.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to systems and methods for provisioning and managing of certificates for accessing secure services in a network.

Some services from a network device in a network are secure services for which the data provided to client devices may be private and confidential in nature. Typically, the communication between the network device and the client devices for accessing of secure services is not substantially secure. The network device is unable to establish a trust relationship with the client devices, that is, the network device is unable to establish a trust that the client devices are what they claim to be.

Trust relationships are typically established between client devices and servers hosting secure services by providing certificates to the client devices. Such certificates, also referred to as client-device certificates, authenticate and authorize the client devices to access secure services from the servers. The client-device certificates assist the servers in determining that the client devices are what they claim to be.

Client-device certificates are provided to the client devices under the authority and approval of a certificate authority. The certificate authority, typically, is an external or a third party certification authority recognized for granting and provisioning of certificates. For provisioning of client-device certificates, a signing certificate is issued by the certificate authority to the server. The certificate authority generates and issues the signing certificate to declare that the possessor of the signing certificate is who the certificate claims. The server, based on the signing certificate issued by the certificate authority, provides the client-device certificates to the client devices.

For obtaining a client-device certificate, a request, also referred to as a certificate signing request, is sent by the client device to the server. The request is accompanied with an unsigned client-device certificate which is to be signed by the server. The request from the client device is processed by the server to identify and validate the identity of the client device as claimed by it for accessing the secure service hosted by the server. Based on the validation, the unsigned client-device certificate is signed by the server. The server uses the signing certificate, generated and provided by the certificate authority, for signing the client-device certificate. The signed client-device certificate is provided to the client device by the server, which allows the client device to access the secure service.

As the certificate authority is external or a third party, the process of issuing of the signing certificate is manually handled between the certificate authority and the server. The owner of the server provides information that allows the certificate authority to verify the identity of the owner. The certificate authority verifies that the owner is what is claimed in the provided information. Based on the verification, the certificate authority generates and issues the signing certificate to the server. Involvement of an external certificate authority makes the provisioning of certificates, as described above, complex and time consuming.

Further, client-device certificates may be revoked if the client devices associated with the provisioned client-device certificates are not to be allowed the access to secure services. The revocation is typically done by the certificate authority. The certificate authority maintains information of the client devices and of corresponding client-device certificates for the purposes of revocation.

Typically, when a server is presented a client-device certificate, the server communicates with the certificate authority to check whether the client-device certificate has been revoked by the certificate authority. The certificate authority maintains a certificate revocation list with details, such as serial numbers, of client-device certificates that are revoked. Based on the certificate revocation list, the certificate authority checks the validity of the client-device certificates. The certificate revocation list is substantially large that may consume a large amount of memory. In cases where the memory storing the certificate revocation list fails or is to be replaced, the certificate revocation list may be no more available. Without the list of details of revoked client-device certificates, it is difficult to determine the validity of client-device certificates when used for accessing secure services. This may lead to undesirable grant of access to secure services even when provisioned client-device certificates have been revoked.

As the external certificate authority is relied upon for revocation of client-device certificates and for checking their validity, the methodology as described above, is complex and involves substantial processing. This may lead to delay in checking for validation of certificates against revocation.

Systems and methods for provisioning and managing of certificates in a network environment are described herein. With the systems and methods of the present subject matter, client-device certificates are provided to client devices for allowing applications in the client devices to access secure services provided by a network device, such as a network switch, in a network. For the purposes of the present subject matter, the client device includes a server that hosts applications and communicates with the network device to access secure services from the network device. In an implementation, the client device may also include a computing device, such as a laptop, a desktop computer, and a smart phone, hosting applications and communicating with the network device to access secure services from the network device.

The systems and methods for provisioning and managing of certificates are implemented in the network device. The network device is enabled to, in addition to performing other functions, provide and manage client-device certificates for client devices, without depending on an external certificate authority. The network device, in accordance with the present subject matter, may be referred to as the certificate provisioning and managing enabled network device.

In accordance with the present subject matter, if an application in a client device requires accessing a secure service provided by the network device, the client device has to obtain a client-device certificate before the application can access the secure service. For obtaining a client-device certificate, the client device sends a certificate signing request to the network device. The certificate signing request includes an unsigned client-device certificate to be signed by the network device.

In an implementation, the network device generates a signing certificate based on which it signs and provides client-device certificates to the client devices. The signing certificate is generated based on a root certificate in the network device. The root certificate is an anchoring certificate that facilitates in establishing substantial trust in the signing certificates branching out from it. The root certificate also facilitates in establishing trust in the client-device certificates signed using such signing certificate. The root certificate has a substantially high level of trustworthiness, and the certificates generated or signed based on the root certificate inherit the trustworthy levels of the root certificate. The network device creates and self-signs the root certificate for the purpose of generation of signing certificate.

Further, as the client-device certificates are signed based on the signing certificate and the root certificate of the network device, the network device is able to identify whether the signed client-device certificates, when presented for accessing a secure service, are signed by it. Also, the client-device certificates, provided to the client devices, are valid for use against the network device that signed and provided it. With this, for accessing a secure service from a specific network device the client device has to obtain a client-device certificate signed by that network device. This facilitates in substantially increasing the security levels of communication between the client devices and the network device.

In an implementation, when a client-device certificate is presented by the client device for accessing a secure service from the network device, the validity of the client-device certificate is checked in the network device. The validity is checked to determine whether the certificate has been revoked or is still a valid one. Based on the validity, the client device is allowed to access the secure service from the network device.

Further, the network device is provided with administrator functionalities to revoke the client-device certificates, signed and provisioned by the network device. A signed client-device certificate of a client device may be revoked by the network device for a variety of reasons including denial of accessing of a secure service to the client device, removal of the application from the client device, redeployment of the network device for another use, and such.

With the systems of the present subject matter, a substantially secure communication between a network device and client devices is achieved. Since the method to provide and manage certificates, including their revocations and validation checks, can be performed by a network device without depending on an external certificate authority, the method is substantially simplified, and the time for provisioning of signed client-device certificates are substantially reduced.

Further, in an implementation, information associated with the client-device certificates, signed by the network device, is stored in the network device. The stored information is removed when a signed client-device certificate is revoked by the network device. The validity check of a signed client-device certificate, when presented for accessing of a secure service, is performed by the network device based on the stored information.

Further, the validity checks of the signed client-device certificates are based on the information of the valid client-device certificates, and not revoked client-device certificates. Since the information associated with the revoked client-device certificate is removed, the size of the stored information is smaller in comparison to the typically maintained certificate revocation list. This facilitates in reducing the load on the memory of the network device.

The above systems and methods are further described in conjunction with the FIGS. 1, 2, 3, 4, 5 and 6. It should be noted that the description and figures merely illustrate the principles of the present subject matter. It will thus be understood that various arrangements can be devised that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter. Moreover, all statements herein reciting principles, aspects, and embodiments of the present subject matter, as well as specific examples thereof, are intended to encompass equivalents thereof.

Figure 1:
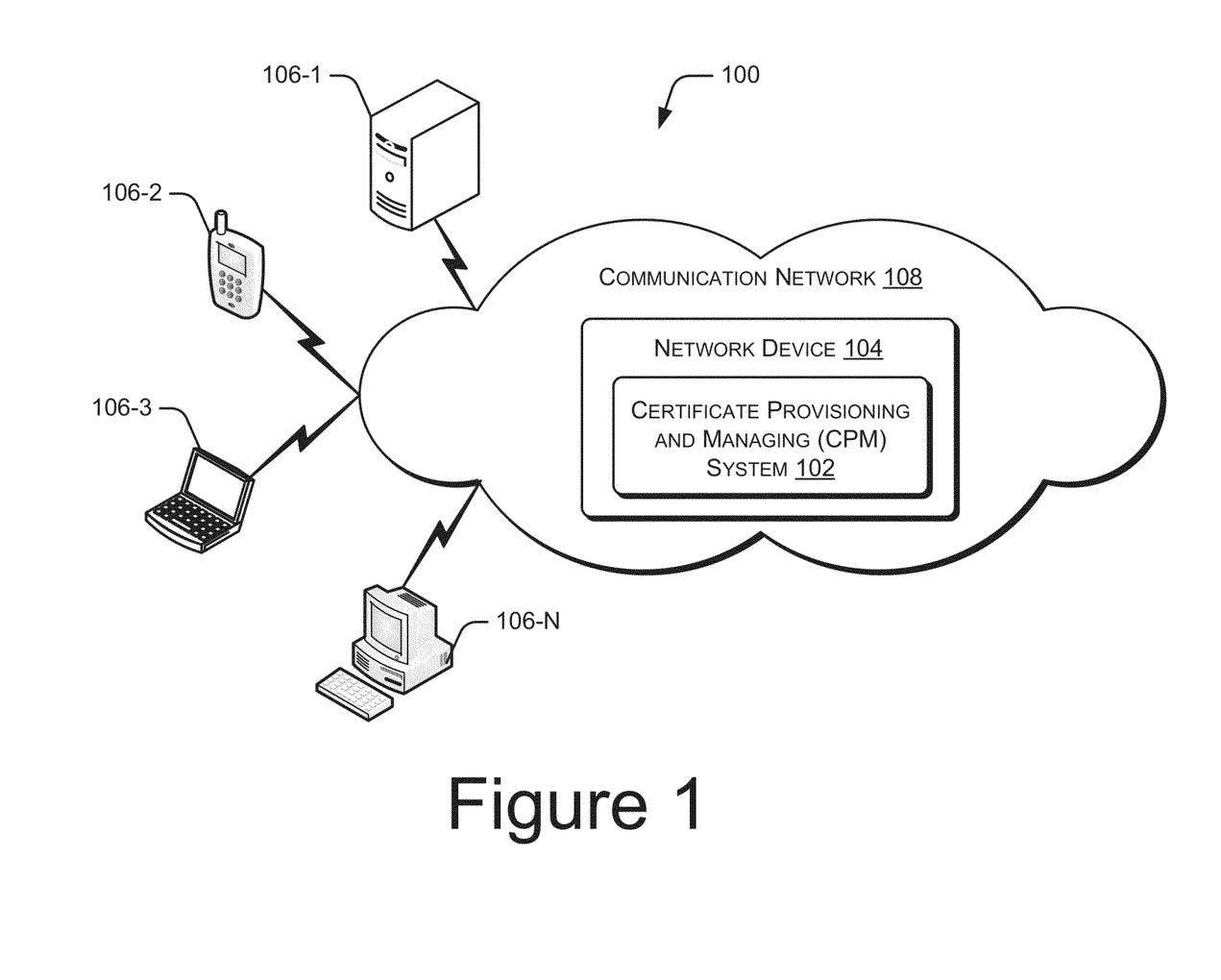
FIG. 1 illustrates a networking environment implementing a certificate provisioning and managing system in a network device, according to an example of the present subject matter.

FIG. 1 schematically illustrates a networking environment 100 implementing a certificate provisioning and managing (CPM) system 102, according to an implementation of the present subject matter. The network environment 100 may be a public networking environment or a private networking environment. As shown in FIG. 1, the CPM system 102 is implemented in a network device 104 that can provide a plurality of secure networking services. In an implementation, the network device 104 may include a network switch. The CPM system 102 in the network device 104 enables the network device 104 to provide and manage certificates in accordance with the present subject matter. For the sake of simplicity, only one network device 104 is shown in the network environment 100 in FIG. 1; however, in an implementation, the network environment 100 may include more than one network device implemented with the CPM system 102. The CPM system 102 may be a machine readable instructions-based implementation or a hardware-based implementation or a combination thereof.

For the purpose of accessing secure services provided by the network device 104, a plurality of client devices 106-1, 106-2, 106-3, . . . , 106-N are communicatively coupled with the network device 104 implementing the CPM system 102. The client devices 106-1, 106-2, 106-3, . . . , 106-N, hereinafter may be collectively referred to as client devices 106, and individually referred to as a client device 106. The client device 106 may include, but is not restricted to, a server, a desktop computer, a laptop, a smart phone, a PDA, a tablet, and the like. Each of the client devices 106 hosts at least one application that can access a secure service provided by the network device 104.

In an example, the secure services provided by the network device 104 may include, but are not restricted to, selective monitoring of traffic, dynamic provisioning of access control list, hardware encryption of select traffic, and the like. Such secure services may be accessed by applications including, but not restricted to, network monitor, intrusion protection system, firewall, and the like, hosted by the client devices 106.

The network device 104 implementing the CPM system 102 can be implemented in a communication network 108. The client devices 106 are communicatively coupled to the network device 104 implementing the CPM system 102 over the communication network 108 through one or more communication links. The communication links between the client devices 106 and the network device 104 are enabled through a desired form of communication, for example, via dial-up modem connections, cable links, and digital subscriber lines (DSL), wireless or satellite links, or any other suitable form of communication.

The communication network 108 may be a wireless network, a wired network, or a combination thereof. The communication network 108 can also be an individual network or a collection of many such individual networks, interconnected with each other and functioning as a single large network, e.g., the Internet or an intranet. The communication network 108 can be implemented as one of the different types of networks, such as intranet, local area network (LAN), wide area network (WAN), the internet, and such. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 108 may also include individual networks, such as, but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the terminology, the communication network 108 includes other network entities, such as gateways and routers; however, such details have been omitted to maintain the brevity of the description. Further, it may be understood that the communication between the network device 104 implementing the CPM system 102, the client devices 106, and other entities may take place based on the communication protocol compatible with the communication network 108.

In the communication network 108, if an application in a client device 106 has to access a secure service provided by the network device 104, the client device 106 obtains a client-device certificate, signed by the network device 104, before the application can access the secure service. For obtaining a signed client-device certificate, the client device 106 sends a certificate signing request with an unsigned client-device certificate to be signed by the network device 104. The CPM system 102 allows the network device 104 to sign the client-device certificate and provide it to the client device 106, as has been discussed in detail below.

Figure 2:
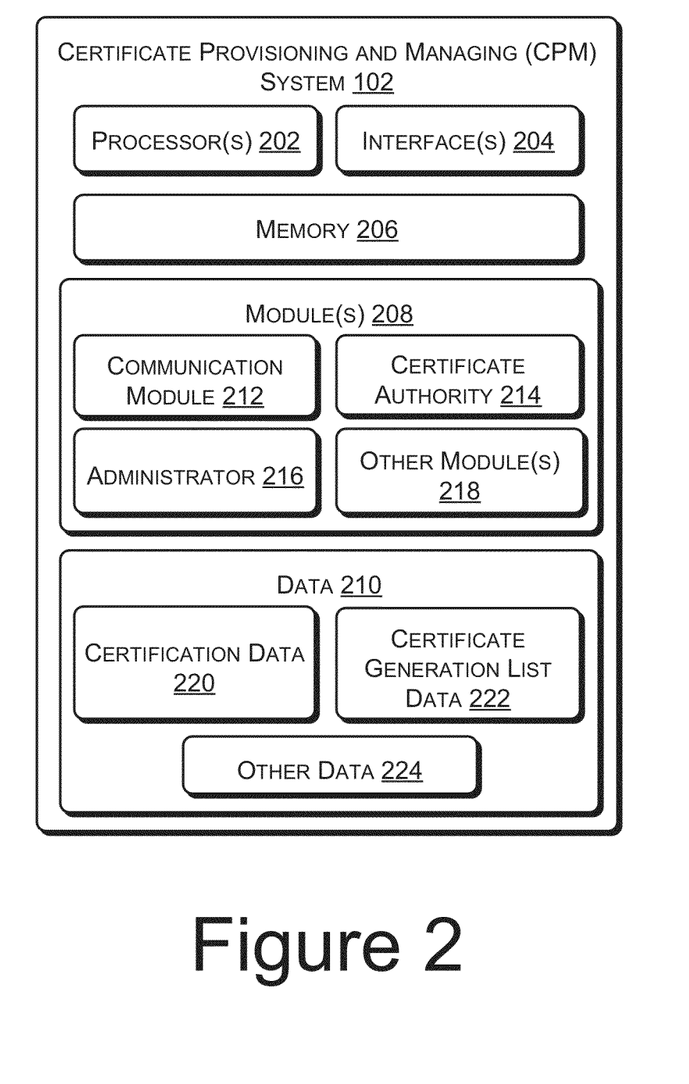
FIG. 2 illustrates the certificate provisioning and managing system, according to an example of the present subject matter.

FIG. 2 illustrates the CPM system 102, according to an implementation of the present subject matter. In an implementation, the CPM system 102 includes processor(s) 202. The processor(s) 202 may be implemented as microprocessors, microcomputers, microcontrollers, digital signal processors, central processing units, state machines, logic circuitries, and/or any devices that manipulate signals based on operational instructions. Among other capabilities, the processor(s) 202 fetch and execute computer-readable instructions stored in the memory. The functions of the various elements shown in FIG. 2, including any functional blocks labeled as "processor(s)", may be provided through the use of dedicated hardware as well as hardware capable of executing machine readable instructions.

The CPM system 102 also includes interface(s) 204. The interface(s) 204 may include a variety of machine readable instruction-based and hardware interfaces that allow the CPM system 102 and the network device 104 to interact with the client devices 106. Further, the interface(s) 204 may enable the CPM system 102 and the network device 104 to communicate with other devices, such as network entities, web servers and external repositories.

Further, the CPM system 102 includes memory 206, coupled to the processor(s) 202. The memory 206 may include any computer-readable medium including, for example, volatile memory (e.g., RAM), and/or non-volatile memory (e.g., EPROM, flash memory, etc.).

Further, the CPM system 102 includes module(s) 208 and data 210. The modules 208 may be coupled to the processor(s) 202. The module(s) 208, amongst other things, include routines, programs, objects, components, data structures, and the like, which perform particular tasks or implement particular abstract data types. The module(s) 208 further include modules that supplement applications on the CPM system 102, for example, modules of an operating system. The data 210 serves, amongst other things, as a repository for storing data that may be fetched, processed, received, or generated by the module(s) 208. Although the data 210 is shown internal to the CPM system 102, it may be understood that the data 210 can reside in an external repository (not shown in the figure), which may be coupled to the CPM system 102. The CPM system 102 may communicate with the external repository through the interface(s) 204 to obtain information from the data 210.

In an implementation, the module(s) 208 of the CPM system 102 includes communication module 212, a network device certificate authority 214, a network device administrator 216, and other module(s) 218. The network device certificate authority 214 is simply referred as certificate authority 214, and the network device administrator 216 is simply referred as administrator 216. In an implementation, the data 210 of the CPM system 102 includes certification data 220, certificate generation list data 222, and other data 224. The other module(s) 218 may include programs or coded instructions that supplement applications and functions, for example, programs in the operating system of the CPM system 102, and the other data 224 comprise data corresponding to other module(s) 218.

The following description describes the provisioning and managing of certificates through the CPM system 102 in the network device 104 for accessing of a secure service by a client device 106, in accordance with the present subject matter, and it will be understood that the concepts thereto may be extended to provisioning and managing of certificates in the network device 104 in the communication network 108 for accessing of a plurality of secure services by more than one client device 106 in a similar manner.

For the purposes of provisioning signed client-device certificates, the certificate authority 214 creates a root certificate for the network device 104. The root certificate is self signed by the certificate authority 214 for generating further certificates in the network device 104. The self signed root certificate is indicative of identity of the network device 104 in which it is created. Certificates generated based on the root certificate, and the certificates signed using the certificates branching from the root certificate, have the identity of the network device 104.

Based on the root certificate, the certificate authority 214 generates a signing certificate which is further used to sign a certificate signing request coming from the client device 106 to allow the client device 106 to access a secure service from the network device 104. The details of the root certificate and the signing certificate are stored in the certification data 220.

For obtaining a signed client-device certificate, the client device 106 initiates to establish an encrypted, but unauthenticated, SSL connection with the network device 104. The encrypted SSL connection is established to prevent any pilferage of data being communicated over the connection. Based on the initiation of the client device 106, the communication module 212 establishes the encrypted SSL connection with the client device 106. While establishing the connection, the communication module 212 sends a network-device certificate to the client device 106. The network-device certificate is a general purpose certificate generated by the certificate authority 214 and sent from the network device 104 in order to let the client device 106 know the identity of the network device 104 with which it is communicating. The details of the network-device certificate are stored in the certification data 220.

Upon establishing the encrypted SSL connection and identifying the identity of network device 104, the client device 106 sends a certificate signing request to the network device 104, over the encrypted SSL connection. The certificate signing request includes a client-device certificate which is unsigned and is to be signed and provided by the network device 104 in order for an application in the client device 106 to access a secure service. In an example, the client-device certificate in the certificate signing request is configured such that it may be specific to the client device 106 from which it is sent. In an example, the client-device certificate may be specific to a secure service for which certification is requested. In another example, the client-device certificate may be specific to an application through which the secure service is to be accessed. The client-device certificate may be based on X.509 protocol.

The certificate authority 214 receives the certificate signing request from the client device 106. The certificate authority 214 signs the unsigned client-device certificate in the certificate signing request based on the signing certificate generated for the network device 104. The communication module 212 then provides the signed client-device certificate to the client device 106 over the encrypted SSL connection. The signed client-device certificate provided to the client device 106 may be referred to as the provisioned client-device certificate.

Once the signed client-device certificate is provisioned to the client device 106 the encrypted SSL connection between the client device 106 and the network device 104 is broken. The client device 106 then initiates to establish an application SSL connection with the network device 104 using the provisioned client-device certificate. The application SSL connection is an authenticated and encrypted connection established for the purpose of accessing of secure service provided by the network device 104. Based on the initiation of the client device 106, the communication module 212 establishes the application SSL connection with the client device 106.

In an implementation, for signing of the certificate signing request and the client-device certificate therein, the certificate authority 214 processes the certificate signing request to identify the application, the client device 106 from which the request is made, and the secure service for which the request is made. The administrator 216 validates the certificate signing request by determining whether the request is for a secure service that can be allowed access to the client device 106. Based on the validation, the administrator 216 provides an approval, and based on the administrator approval the certificate authority 214 signs the certificate signing request and the unsigned client-device certificate.

In an implementation, the certificate authority 214 incorporates or codes a network device identifier in the signed client-device certificate. The network device identifier is indicative of the identity of the network device 104. With the network device identifier in the provisioned client-device certificate, the client device 106 is able to identify the network device 104 to which it communicating for accessing the secure service. In an example, the network device identifier includes media access control (MAC) address of the network device 104.

The incorporation of network device identifier and the signing of the client-device certificate using the signing certificate of the network device 104 make the provisioned client-device certificate valid for use specifically against the network device 104. Thus, the client-device certificate, provided by the network device 104, is not usable by the client device 106 against another network device for accessing a secure service. A client device 106 can obtain signed client-device certificates from a plurality of network devices, where each of the client-device certificates is uniquely signed by the respective network device.

In an implementation, the certificate authority 214 maintains a certificate generation list in the network device 104. In the certificate generation list, the certificate authority 214 stores information associated with client-device certificates, which are signed and provided from the network device 104 to various client devices 106 and are valid (not revoked) for use against the network device 104 for accessing secure services. The information associated with the signed client-device certificate may be referred to as certificate identifying information. In an implementation, the stored certificate identifying information includes, but is not restricted to, date of signing of client-device certificate, serial number of client-device certificate and identification attribute of the client device. In an implementation, a cryptographic code, for example SHA-1 hash code, of the certificate identifying information may be stored in the certificate generation list so that the certificate generation list is securely maintained and is not modified.

Since the certificate generation list stores the information of those client-device certificates signed in a specific network device 104, the certificate generation list is not valid for another network device. The certificate generation list may be maintained locally in the network device 104 for the purpose of validation check of the client-device certificates used for accessing the secure service provided by the network device 104. The certificate generation list is stored in the certificate generation list data 222.

Further, the client device 106 may store the provisioned client-device certificate locally in its memory, and use the provisioned client-device certificate for subsequent accessing of the secure service from the network device 104. For accessing of the secure service using the provisioned client-device certificate, the client device 106 initiates to establish an application SSL connection with the network device 104 to send the provisioned client-device certificate to the network device 104. The communication module 212 communicates with the client device 106 to establish the application SSL connection, and the certificate authority 214 receives the provisioned client-device certificate from the client device 106. The certificate authority 214 processes the provisioned client-device certificate to determine whether the certificate was signed and provided from the network device 104. The certificate authority 214 may check the network device identifier coded in the provisioned client-device certificate. If the certificate is determined to be not the one signed and provided from the network device 104, the application SSL connection is broken.

Further, if the certificate is determined to be the one signed and provided from the network device 104, the certificate authority 214 determines whether the provisioned client-device certificate is a valid certificate for accessing of the secure service. The client-device certificate may be an invalid certificate if it has been revoked. For determining the validity, the certificate authority 214 queries the certificate generation list. If the provisioned client-device certificate is determined to be a valid certificate then the communication module 212 allows the application in the client device 106 to access the secure service from the network device 104 over the application SSL connection. And, if the provisioned client-device certificate is determined to be an invalid certificate, due to revocation or the associated information not being present in the certificate generation list, then the communication module 212 breaks the application SSL connection to deny the accessing of the secure service to the application in the client device 106.

Further, in an implementation, the administrator 216 may revoke the client-device certificates signed and provided from the network device 104 to the client device 106. As mentioned earlier, a client-device certificate may be revoked for a variety of reasons including denial of accessing of a secure service to the corresponding client device 106, removal of the application from the corresponding client device 106, redeployment of the network device 104 for another use, and such. If a revoked client-device certificate is used by the client device 106 for accessing a secure service, the access is denied.

In an implementation, as and when a client-device certificate provisioned to the client device 106 is revoked by the administrator 216, the certificate authority 214 removes the certificate identifying information associated with the revoked certificate from the certificate generation list stored in the network device 104.

Further, in an implementation, if a provisioned client-device certificate is revoked while the corresponding client device 106 and the network device 104 are communicating with each other, then the communication module 212 informs the client device 106 about the revocation of the client-device certificate provisioned to it. Based on the information of revocation, the client device 106 may accordingly remove the details of the revoked client-device certificate stored locally from its memory.

Figure 3:
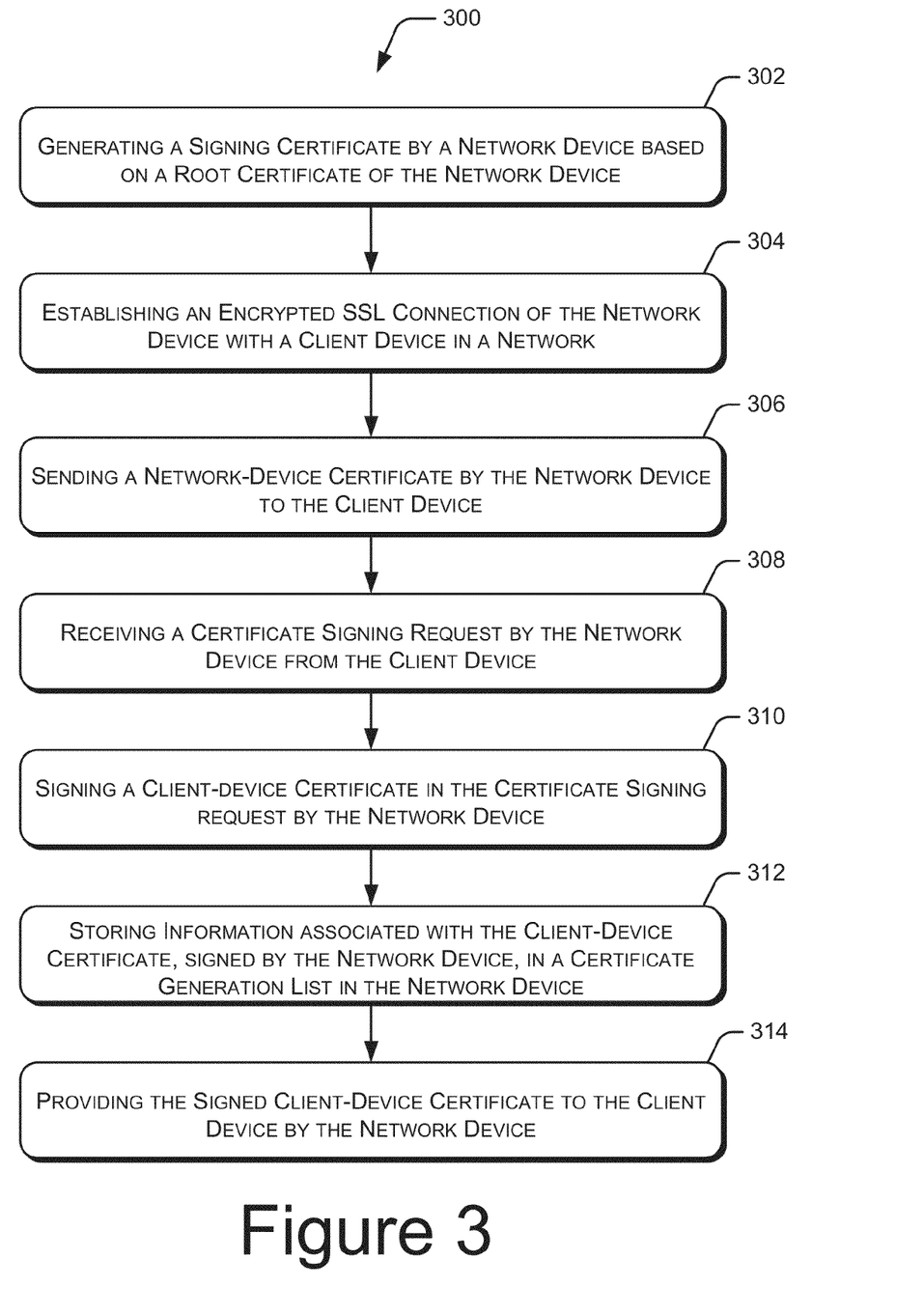
FIG. 3 illustrates a method for provisioning and managing of certificates in a network, according to an example of the present subject matter.
Figure 4:
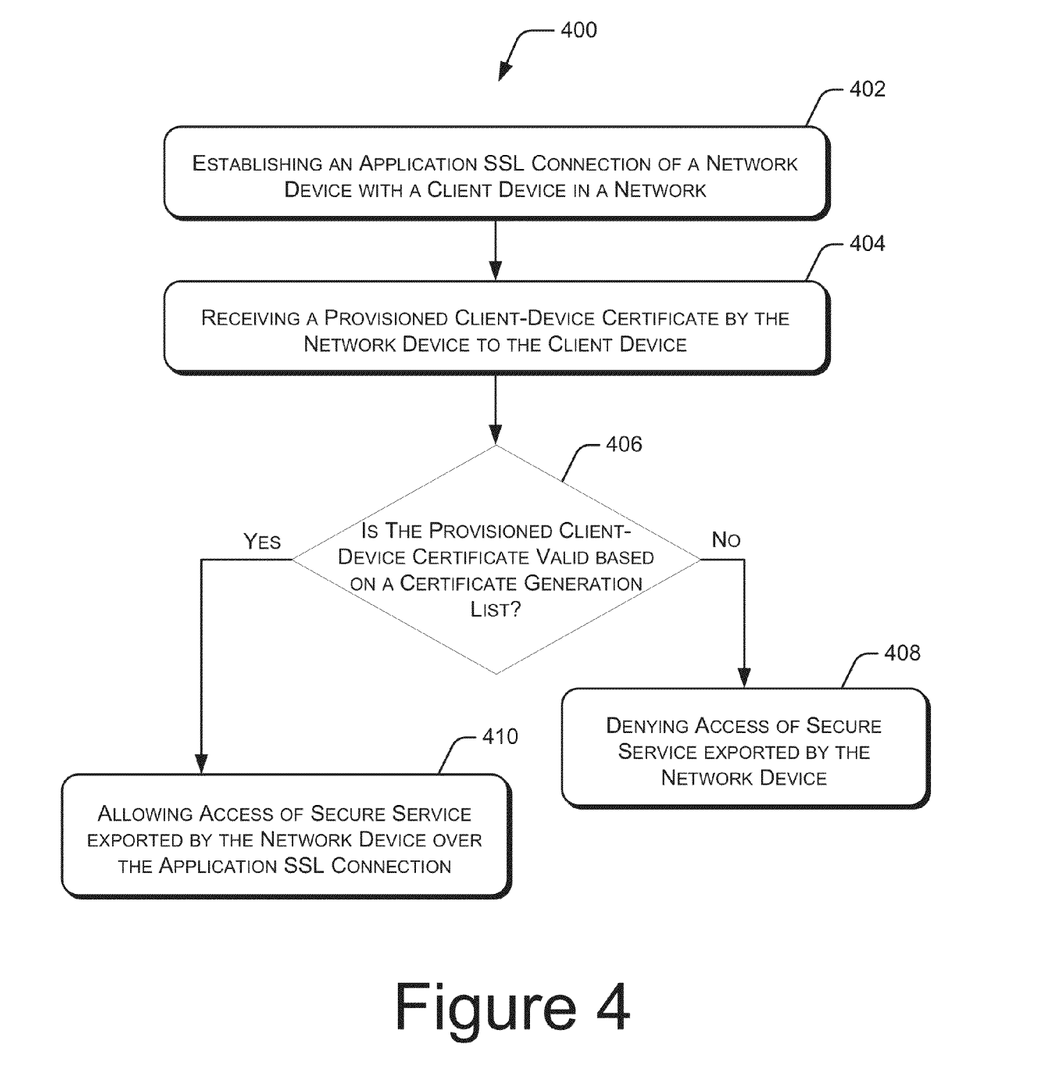
FIG. 4 illustrates a method for accessing a secure service with a provisioned client-device certificate in a network, according to an example of the present subject matter.
Figure 5:
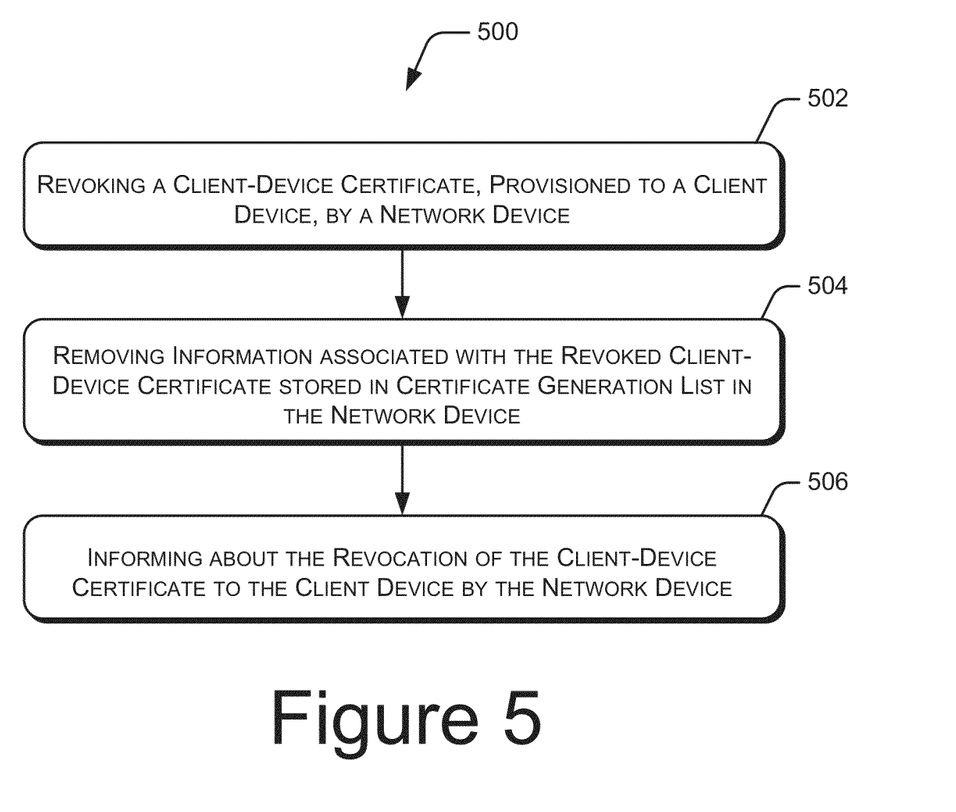
FIG. 5 illustrates a method for managing certificates in a network, according to an example of the present subject matter.

FIG. 3 illustrates a method 300 for provisioning and managing of certificates in a network, according to an implementation of the present subject matter. FIG. 4 illustrates a method 400 for accessing a secure service with a provisioned client-device certificate in a network, according to an implementation of the present subject matter. FIG. 5 illustrates a method 500 for managing certificates in a network, according to an implementation of the present subject matter. The order in which the methods 300, 400 and 500 are described is not intended to be construed as a limitation, and any number of the described method blocks can be combined in any order to implement the methods 300, 400 and 500, or an alternative method. Additionally, individual blocks may be deleted from the methods 300, 400 and 500 without departing from the spirit and scope of the subject matter described herein.

Furthermore, the methods 300, 400 and 500 can be implemented by processor(s) or computing devices in any suitable hardware, non-transitory machine readable instructions, or combination thereof. It may be understood that steps of the methods 300, 400 and 500 may be executed based on instructions stored in a non-transitory computer readable medium as will be readily understood. The non-transitory computer readable medium may include, for example, digital data storage media, digital memories, magnetic storage media, such as a magnetic disks and magnetic tapes, hard drives, or optically readable digital data storage media.

Further, although the methods 300, 400 and 500 may be implemented in network devices in different communication network environments for accessing secure services; in examples described in FIG. 3, FIG. 4 and FIG. 5, the methods 300, 400 and 500 are explained in context of the aforementioned CPM system 102 in the network device 104 in the communication network 108, for the ease of explanation.

Referring to FIG. 3, at block 302, a signing certificate is generated by the network device 104 based on a root certificate of the network device 104. The root certificate is created and self-signed by the CPM system 102 in the network device 104, and based on it the signing certificate is generated in the network device 104.

For a client device 106 to obtain a signed client-device certificate for accessing a secure service provided by the network device 104, at block 304 an encrypted SSL connection of the network device 104 with the client device 106 is established. The connection is initiated by the client device 106 and established with the CPM system 102 in the network device 104. At block 306, a network-device certificate is sent by the network device 104 to the client device 106. The network-device certificate is sent by the CPM system 102 in the network device 104, over the encrypted SSL connection. With this, the client device 106 can identify the identity of the network device 104 to which it is communicating.

After establishing the encrypted SSL connection and identity sharing, at block 308 a certificate signing request is received by the network device 104 from the client device 106. The certificate signing request is received by the CPM system 102 in the network device 104. The certificate signing request is sent by the client device 106, requesting for signing of an unsigned client-device certificate by the network device 104 for allowing the access to the provided secure service.

At block 310, a client-device certificate in the received certificate signing request is signed by the network device 104. The client-device certificate is signed by the CPM system 102 in the network device 104. As mentioned earlier, the client-device certificate is signed based on an administrator approval of the certificate signing request. For the purpose of administrator approval, the certificate signing request is processed to determine the identity of the client device 106 and to determine whether the client device 106 can be allowed to access the provided secure service.

In an implementation, a network device identifier, for example, MAC address, of the network device 104 is coded or incorporated in the signed client-device certificate. The network device identifier is coded to let the client device 106 determine the identity of network device 104 every time the secure service from the network device 104 is accessed.

At block 312, information associated with the client-device certificate, signed by the network device 104, is stored in a certificate generation list in the network device 104. The information is stored and certificate generation list is maintained by the CPM system 102 in the network device 104. The stored information is referred for determining the validity of any provisioned client-device certificate when used against the network device 104 for accessing the provided secure service.

After the signing of the client-device certificate, at block 314 the signed client-device certificate is provided by the network device 104 to the client device 106. The signed client-device certificate is provided over the encrypted SSL connection by the CPM system 102 in the network device 104. The client-device certificate is provided to allow the client device 106 to access the secure service provided by the network device 104. The client device 106 may store the provisioned client-device certificate in its memory and use the same for the accessing of secure service is future.

Referring to FIG. 4, for a client device 106 to access a secure service with a provisioned client-device certificate, at block 402 an application SSL connection of the network device 104 is established with the client device 106. The connection is initiated by the client device 106 and established with the CPM system 102 in the network device 104 using the provisioned client-device certificate. At block 404, the provisioned client-device certificate is received by the network device 104 from the client device 106. The provisioned client-device certificate is sent by the client device 106 and received by the CPM system 102 in the network device 104 over the application SSL connection.

At block 406, the validity of the provisioned client-device certificate is checked based on the certificate generation list. The validity is checked by the CPM system 102 in the network device 104. As mentioned earlier, the certificate generation list stored in the network device 104 is queried to check the validity of provisioned client-device certificate. The certificate generation list stores information associated with the client-device certificates, signed and provided from the network device 104, which are valid and have not been revoked. If upon checking it is determined that the provisioned client-device certificate is an invalid certificate ('no' path from block 406), the accessing of secure service to the client device 106 is denied (block 408). With this, the application SSL connection is broken and no further communication takes place between the client device 106 and the network device 104.

If upon checking it is determined that the provisioned client-device certificate is a valid certificate ('yes' branch from block 406), the application in the client device 106 is allowed to access the secure service provided by the network device 104 over the application SSL connection (block 410).

Referring to FIG. 5, for managing certificates, at block 502 a client-device certificate provided to the client device 106 is revoked by the network device 104. The client-device certificate signed and provided by the network device 104 is revoked by the administrator functionality provided by the CPM system 102 in the network device 104.

After the revocation of the provisioned client-device certificate, at block 504 the information associated with the revoked client-device certificate is removed from the certificate generation list in the network device 104. The certificate identifying information associated with the revoked client-device certificate is removed from the certificate generation list by the CPM system 102 in the network device 104.

Further, at block 506, the client device 106 associated with the revoked client-device certificate is informed about the revocation. The client device 106 is informed by the CPM system 102 in the network device 104. Based on this information, the client device 106 may remove the provisioned client-device certificate and all its details from its local memory.

Figure 6:
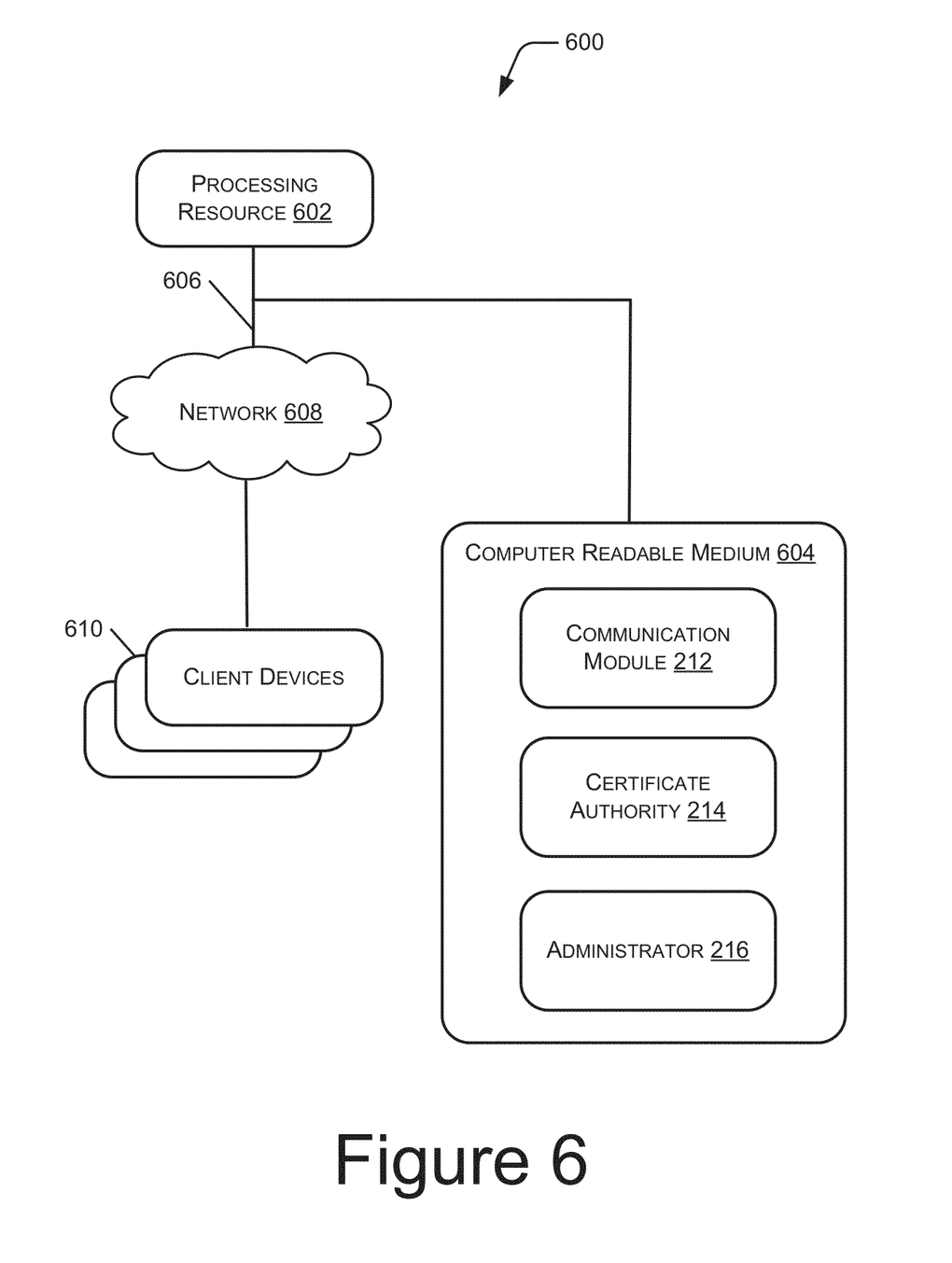
FIG. 6 illustrates a network environment for provisioning and managing of certificates, according to an example of the present subject matter.

FIG. 6 illustrates a network environment 600 for provisioning and managing of certificates, according to an implementation of the present subject matter. The network environment 600 may be a public networking environment or a private networking environment. In one implementation, the network environment 600 includes a processing resource 602 communicatively coupled to a computer readable medium 604 through a communication link 606.

For example, the processing resource 602 can be a network device, such as a network switch, providing secure services for accessing. The computer readable medium 604 can be, for example, an internal memory device or an external memory device. In one implementation, the communication link 606 may be a direct communication link, such as any memory read/write interface. In another implementation, the communication link 606 may be an indirect communication link, such as a network interface. In such a case, the processing device 602 can access the computer readable medium 604 through a network 608. The network 608 may be a single network or a combination of multiple networks and may use a variety of different communication protocols.

The processing resource 602 and the computer readable medium 604 may also be communicatively coupled to client devices 610 over the network 608. The client devices 610 can include, for example, servers, desktop computers, laptops, smart phones, PDAs, tablets. The client devices 610 have applications that communicate with the processing resource 602 for accessing secure services provided by the processing resource 602.

In one implementation, the computer readable medium 604 includes a set of computer readable instructions, such as the communication module 212, the certificate authority 214 and the administrator 216. The set of computer readable instructions can be accessed by the processing resource 602 through the communication link 606 and subsequently executed to perform acts for provisioning and managing certificates in a network.

For example, the certificate authority 214 can create and sign a root certificate for the processing resource 602. Based on the root certificate of the processing resource 602, the certificate authority 214 can generate a signing certificate in the processing resource 602. Further, certificate authority 214 can receive a certificate signing request in the processing resource 602 from a client device 610. The certificate signing request is received over an encrypted SSL connection established with the client device 610. The communication module 212 can establish the encrypted SSL connection of the processing resource 602 with the client device 610.

The certificate signing request includes a client-device certificate which is unsigned and is to be signed by the processing resource 602. The administrator 216 can validate the certificate signing request, and, upon validation, the certificate authority 214 can sign the client-device certificate in the processing resource 602. The signing is based on the signing certificate of the processing resource 602. Upon signing, the communication module 212 can provide the signed client-device certificate to the client device 610 for allowing the client device 610 to access a secure service provided by the processing resource 602. The signed client-device certificate is provided over the encrypted SSL connection.

In an example, the certificate authority 214 can incorporate a network device identifier in the signed client-device certificate. In an example, the certificate authority 214 can store certificate identifying information in the processing resource 602, where the certificate identifying information is associated with the client-device certificates, signed by the certificate authority 214.

Further, in an example, the administrator 216 can revoke client-device certificates provided by the processing resource 602 for the client devices 610. Based on the revocation, the certificate authority 214 can remove the certificate identifying information, associated with the revoked client-device certificates, from the processing resource 602.

Further, in an example, when a signed client-device certificate is present by a client device 610 to the processing resource 602 for accessing a secure service, the certificate authority 214 can determine the validity of the presented client-device certificate. The validity is determined based on the certificate identifying information stored in the processing resource 602. Based on the validity, the communication module 212 can establish an application SSL connection of the processing resource 602 with the client device 610 and allow the client device 610 to access the secure service from the processing resource 602.

Although embodiments for provisioning and managing of certificates in a network have been described in language specific to structural features and/or methods, it is to be understood that the present subject matter is not necessarily limited to the specific features or methods described. Rather, the specific features and methods are disclosed and explained in the context of a few examples for provisioning and managing of certificates.

We claim:

1. A method for provisioning and managing certificates in a network, the method comprising:
   generating a signing certificate by a network device based on a root certificate of the network device;
   signing a client-device certificate for a client device based on the signing certificate of the network device; and
   providing the signed client-device certificate to the client device, wherein the client-device certificate allows the client device to access a secure service provided by the network device;
   wherein the signed client-device certificate is specifically associated with the network device and does not allow the client device to access a secure service provided by another network device, and
   the signed client-device certificate includes a first Media Access Control (MAC) address, wherein if a second MAC address used by a client device requesting access to a secure service does not match the first MAC address, a connection between the network device and the client device is terminated.

2. The method as claimed in claim 1, wherein the method comprises the network device signing the client-device certificate in response to an administrator determining that the secure service is a secure service which the client device is allowed to access.

3. The method as claimed in claim 1 further comprising:
   receiving the client-device certificate, signed by the network device, from the client device;
   determining, by the network device, whether the client-device certificate is valid, wherein the determining is based on information associated with the client-device certificates signed by the network device; and
   allowing access of the secure service to the client device based on the determining.

4. The method as claimed in claim 1 further comprising:
   revoking the client-device certificate for the client device by removing information relating to the client-device certificate from a certificate generation list stored in the network device; said certificate generation list storing information relating to non-revoked client-device certificates signed by the network device.

5. The method as claimed in claim 4, further comprising determining that a client-device certificate is valid if information relating to the client device certificate is included in said certificate generation list and determining that a client-certificate is invalid if information relating to the client device certificate is not included in said certificate generation list.

6. The method as claimed in claim 4, wherein the revoking further comprises:
   informing the client device about revocation of the client-device certificate.

7. A network device providing a secure service in a network, the network device comprising:
   a processor; and
   a certificate authority coupled to the processor to:
      generate a signing certificate based on a root certificate of the network device;
      receive, from a client device, a certificate signing request comprising a client-device certificate to be signed by the network device;
      sign the client-device certificate based on the signing certificate of the network device;
      store, in the network device, information relating to said client-device certificate in a certificate generation list of client device certificates signed by the network device;
      store, in another network location, a copy of the certificate generation list; and
      when a determination is made to revoke the client-device certificate, revoke the client-device certificate for the client device, signed by the network device, by removing information relating to the client-device certificate from the certificate generation list stored in the network device and from the copy of the certificate generation list stored in another network location; and
      sending notification of the revocation to the client device; and
   a communication module coupled to the processor to:
      provide the client-device certificate, signed by the certificate authority, to the client device, wherein the client-device certificate is provided to allow the client device to access the secure service,
   wherein failure to provide a client-device certificate that appears on the certificate generation list results in denial of access to the secure service.

8. The network device as claimed in claim 7, wherein the certificate authority stores certificate identifying information associated with the client-device certificate, signed by the network device, in the network device.

9. The network device as claimed in claim 8, wherein the certificate identifying information associated with the client-device certificate comprises date of signing of the client-device certificate, serial number of the client-device certificate and identification attribute of the client device.

10. The network device as claimed in claim 8, wherein the certificate authority is to make a determination of validity of the client-device certificate received from the client device for accessing the secure service, the determination of validity including checking whether the certificate identifying information is stored in the network device.

11. The network device as claimed in claim 10, wherein the communication module establishes an application SSL connection of the network device with the client device based on the client-device certificate received from the client device, and the communication module allows accessing of the secure service to the client device, over the application SSL connection, based on the validity of the client-device certificate.

12. The network device as claimed in claim 7, wherein the certificate authority incorporates a network device identifier in the client-device certificate signed by the network device.

13. A non-transitory computer-readable medium comprising instructions executable by a processor to:

generate a signing certificate in a network device based on a root certificate of the network device;

receive a certificate signing request in the network device from a client device over an encrypted SSL connection, the certificate signing request comprises a client-device certificate to be signed;

sign the client-device certificate in the network device, the client-device certificate is signed based on the signing certificate of the network device;

store information relating to the signed client-device certificate in a certificate generation list in the network device; and provide the client-device certificate, signed in the network device, to the client device over the encrypted SSL connection, wherein the client-device certificate is provided for allowing the client device to access a secure service provided by the network device;

wherein the client device possesses a plurality of certificates for different devices on the network, each certificate allowing access to a different network device, wherein revocation of one certificate does not result in the revocation of other certificates held by the client device.

14. The non-transitory computer-readable medium as claimed in claim 13 comprising instructions executable by the processor to:

revoke the client-device certificate provided by the network device for the client device by removing information relating to the signed client-device certificate from the certificate generation list.

15. The non-transitory computer-readable medium as claimed in claim 13 further comprising instructions to determine whether the client-device certificate is valid in response to receiving a request for the secure service from the client device and to provide the secure service to the client device in response to receiving the request and determining that the client-device certificate is valid.

16. The non-transitory computer-readable medium as claimed in claim 13 wherein said secure service is selected from the group comprising: selective monitoring of traffic and dynamic provisioning of access control list.

17. The network device as claimed in claim 7 wherein the network device is a network switch.

18. The method as claimed in claim 6, wherein the revoking further comprises:

receiving a confirmation that the certificate has been removed from the client device memory.

19. The network device as claimed in claim 7, wherein the client-device certificate includes a client device identifier, the client device identifier comprising a Media Access Control (MAC) address.

20. The network device as claimed in claim 8, wherein the identifying information is a date of signing of the client-device certificate.

* * * * *